(12) United States Patent
Sasaki et al.

(10) Patent No.: US 8,800,397 B2
(45) Date of Patent: Aug. 12, 2014

(54) POSITIONING DEVICE

(71) Applicant: JTEKT Corporation, Osaka (JP)

(72) Inventors: Yuji Sasaki, Takahama (JP); Hideki Iwai, Toyoake (JP); Kimihiro Onishi, Kasugai (JP); Yasumasa Sakurai, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/911,166

(22) Filed: Jun. 6, 2013

(65) Prior Publication Data

US 2013/0327167 A1    Dec. 12, 2013

(30) Foreign Application Priority Data

Jun. 7, 2012 (JP) ................. 2012-129638

(51) Int. Cl.
- F16H 1/24 (2006.01)
- F16H 3/06 (2006.01)
- F16H 27/02 (2006.01)
- F16H 29/02 (2006.01)
- F16H 29/20 (2006.01)
- G06F 19/00 (2011.01)
- G01B 5/00 (2006.01)

(52) U.S. Cl.
USPC .......... 74/89.23; 74/424.71; 33/702; 700/160

(58) Field of Classification Search
USPC .................. 74/89.23–89.45, 424.71–424.96; 33/702; 700/160, 174, 193
See application file for complete search history.

(56) References Cited

U.S. PATENT DOCUMENTS

| 4,912,856 A * | 4/1990 | Ernst ................................ 33/702 |
| 6,941,669 B2 * | 9/2005 | Shivaswamy et al. .......... 33/502 |
| 7,266,903 B2 * | 9/2007 | Sato ................................. 33/702 |
| 2008/0195244 A1 * | 8/2008 | Jou et al. ........................ 700/174 |
| 2009/0069926 A1 | 3/2009 | Ma |

FOREIGN PATENT DOCUMENTS

JP    2010-284737    12/2010

OTHER PUBLICATIONS

Extended European Search Report issued Sep. 23, 2013 in Patent Application No. 13170566.7.

* cited by examiner

*Primary Examiner* — Troy Chambers
*Assistant Examiner* — Jake Cook
(74) *Attorney, Agent, or Firm* — Oblon, Spivak, McClelland, Maier & Neustadt, L.L.P.

(57) ABSTRACT

Temperatures of a base, a support member, and a support member are measured, and amounts of linear expansion of the base, the support member, and the support member due to temperature differences from a reference temperature are computed. An amount of linear expansion of a ball screw with respect to the support member is measured. An amount of linear expansion of a lead of the ball screw is computed based on the sum of the aforementioned amounts of linear expansion, and an amount of rotation of the ball screw is adjusted from an amount of rotation of the ball screw at the reference temperature, to an amount of rotation of the ball screw, which corresponds to the amount of linear expansion of the lead at a predetermined temperature.

1 Claim, 3 Drawing Sheets

POSITIONING DEVICE

This application claims priority to Japanese Patent Application No. 2012-129638 filed on Jun. 7, 2012 the disclosure of which, including the specification, drawings and abstract, is incorporated herein by reference in its entirety.

BACKGROUND OF THE INVENTION

1. Field of the Invention

The invention relates to a positioning device that is designed for, for example, a machine tool in which a ball screw is used, and that is able to more accurately compensate an error due to a temperature change.

2. Discussion of Background

There is a positioning device in which a ball screw is supported at respective end portions thereof by a reference holding member and a measurement holding member that are fixed on a base, and a movable body is positioned through the use of the ball screw. There is known a thermal displacement compensation method in which, in the above-described positioning device, the amount of rotation of the ball screw is adjusted on the basis of the amount of linear expansion of the base due to a change in the temperature of the base and the amount of linear expansion of the ball screw with respect to the measurement holding member, so that an error in the positioning amount is compensated (see Japanese Patent Application Publication No. 2010-284737 (JP-2010-284737 A)).

In the conventional positioning device described in Japanese Patent Application Publication No. 2010-284737 (JP-2010-284737 A), on the assumption that the temperatures of the reference holding member and the measurement holding member are equal to the temperature of the base, the temperature of the base is measured and only the amount of linear expansion of the base is obtained to compensate the positioning amount. Therefore, in the case where the temperatures of the reference holding member and the measurement holding member are different from the temperature of the base, an error is caused in the amount of linear expansion. Usually, heat is generated at ball screw holding portions due to rolling friction of a bearing. Therefore, the temperatures of the reference holding member and the measurement holding member are higher than the temperature of the base. Accordingly, with the conventional method, an error based on the amounts of linear expansion of the reference holding member and the measurement holding member is contained in the compensated positioning amount.

SUMMARY OF THE INVENTION

The invention provides a positioning device that is able to more accurately detect the amount of linear expansion of a ball screw, thereby enhancing the positioning accuracy.

According to a feature of an example of the invention, there is provided a positioning device, including: a base; a movable body that is supported so as to be allowed to reciprocate in a predetermined axial direction with respect to the base; a ball screw that is engaged with the movable body, and that reciprocates the movable body; a drive motor that is engaged with a first end of the ball screw, and that transmits rotative power to rotate the ball screw; first support means that is fixed to a first fixed position of the base, and that supports a portion of the ball screw, the portion being near the first end of the ball screw, at a first reference position that is located at a predetermined distance from the first fixed position in the axial direction such that the portion of the ball screw is rotatable and immovable in the axial direction; second support means that is fixed to a second fixed position of the base, and that supports a second end of the ball screw such that the second end is rotatable and movable in the axial direction; distance detection means that is located at a given distance from an end face of the second end in an axial direction of the ball screw, that is fixed to the second support means at a second reference position that is located at a predetermined distance from the second fixed position in the axial direction, and that is able to detect a distance to the end face; temperature detection means for detecting a temperature of the base, a temperature of the first support means, and a temperature of the second support means; and control means for controlling the drive motor, wherein the control means stores a base reference length that is a length of a portion of the base from the first fixed position to the second fixed position at a reference temperature, a first support means reference length that is a length of a portion of the first support means from the first fixed position to the first reference position at the reference temperature, a second support means reference length that is a length of a portion of the second support means from the second fixed position to the second reference position at the reference temperature, and a ball screw reference length that is a length of a portion of the ball screw from the first reference position to the end face of the ball screw at the reference temperature, and the control means obtains a ball screw actual length that is an actual length of the portion of the ball screw from the first reference position to the end face of the ball screw on the basis of an amount of linear expansion of the base reference length, which is obtained through computation based on the base reference length and the detected temperature of the base that is detected by the temperature detection means, an amount of linear expansion of the first support means reference length, which is obtained through computation based on the first support means reference length and the detected temperature of the first support means that is detected by the temperature detection means, an amount of linear expansion of the second support means reference length, which is obtained through computation based on the second support means reference length and the detected temperature of the second support means that is detected by the temperature detection means, and the detected distance that is detected by the distance detection means, and the control means compensates a control amount of the drive motor based on the ball screw actual length and the ball screw reference length.

BRIEF DESCRIPTION OF THE DRAWINGS

The foregoing and further objects, features and advantages of the invention will become apparent from the following description of an example embodiment thereof with reference to the accompanying drawings, wherein like numerals are used to represent like elements and wherein.

DETAILED DESCRIPTION OF EMBODIMENT

Hereinafter, an embodiment of the invention will be described with reference to the accompanying drawings.

Figure 1:
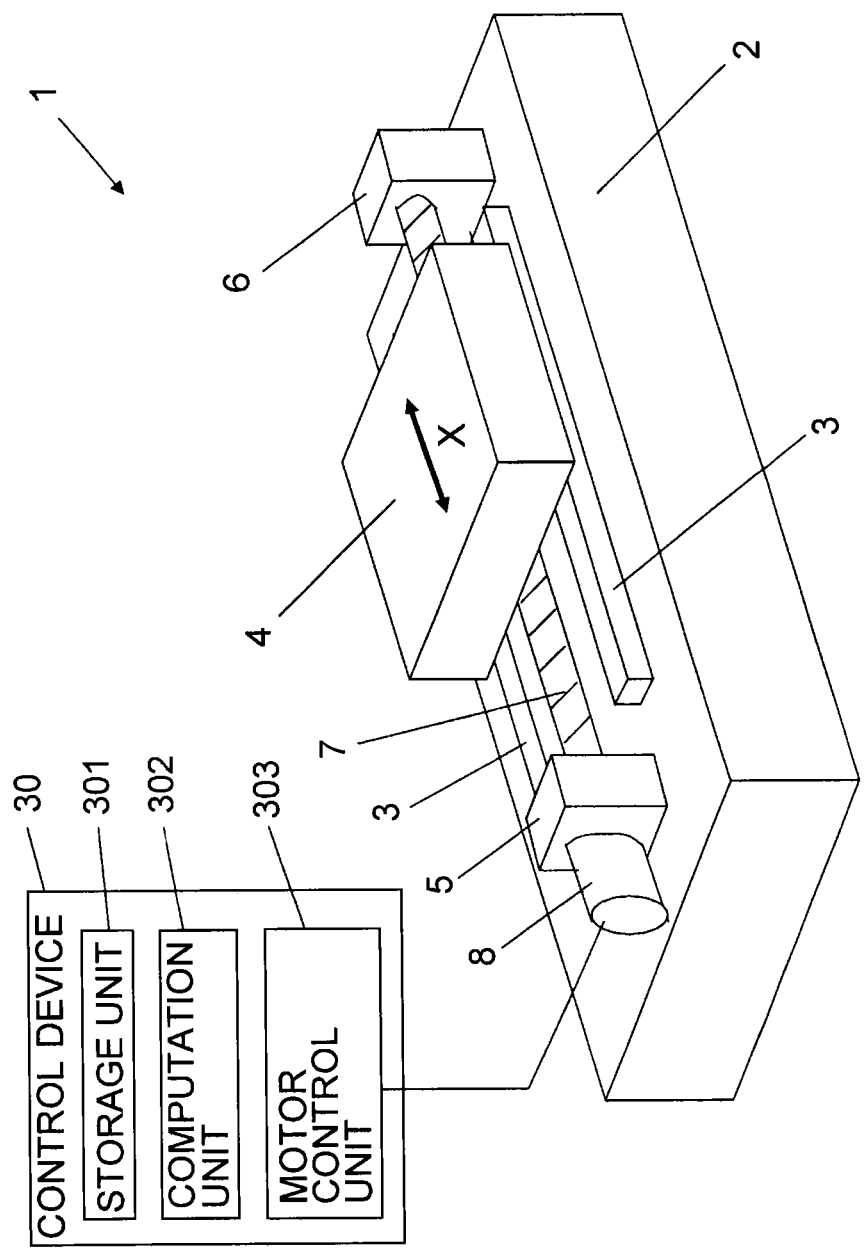
FIG. 1 is a schematic view showing the overall configuration of a positioning device according to an embodiment of the invention.

As shown in FIG. 1, a positioning device 1 includes a base 2, a pair of guides 3 fixed to an upper portion of the base 2, and a movable body 4 that is supported by the guides 3 so as to be allowed to reciprocate in an X-axis direction. A ball screw 7 that is rotatably supported at respective ends thereof by a support member 5 and a support member 6 is engaged with the movable body 4, and a motor 8 fixed to the support member 5 is coupled to the ball screw 7. Thus, the positioning device 1 reciprocates the movable body 4 through the rotation of the motor 8.

The positioning device 1 further includes a control device 30. The control device 30 includes a storage unit 301 that stores various data, a computation unit 302 that performs computation, a motor control unit 303 that controls the rotation of the motor 8, and the like. With the above-described configuration, the positioning device 1 controls the position of the movable body 4 in the X-axis direction by controlling the rotation of the motor 8.

Figure 2:
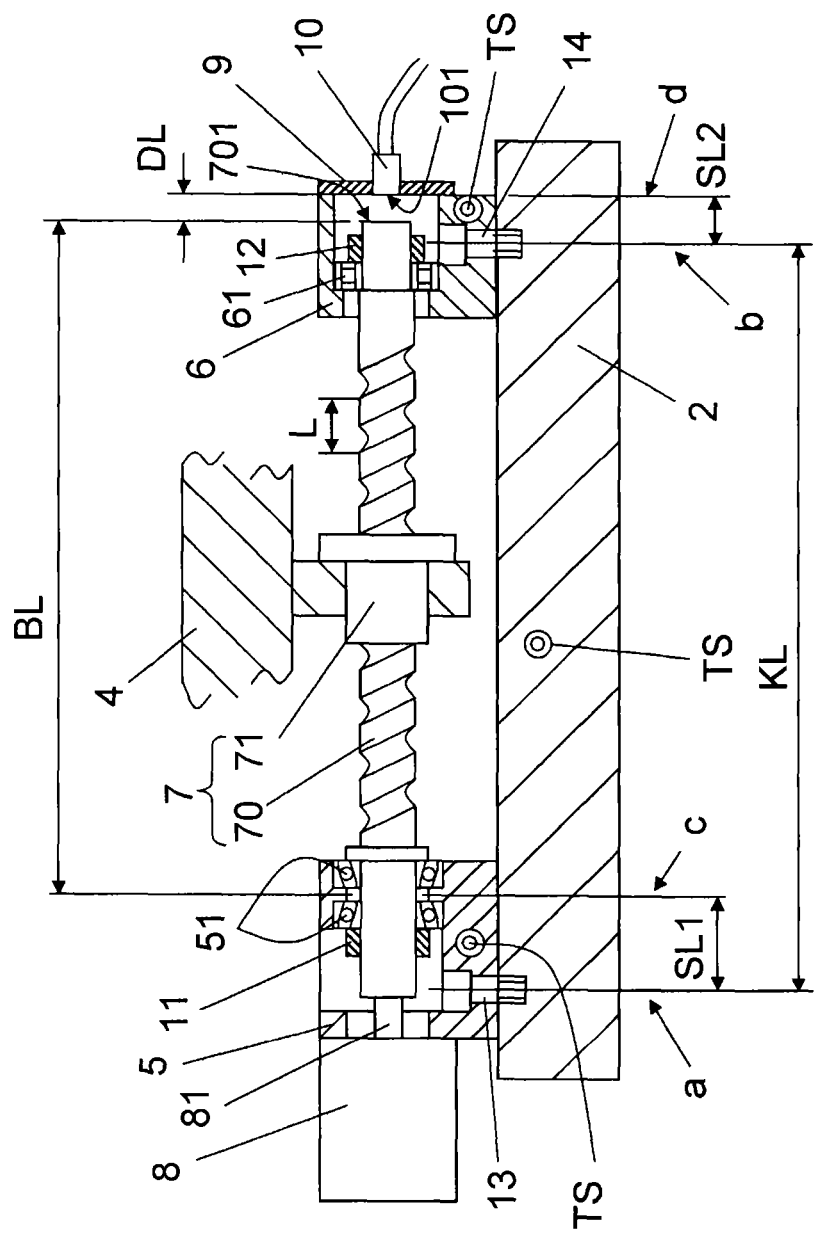
FIG. 2 is a sectional view of a screw portion of the positioning device at a reference temperature.

The details of ball screw holding portions will be described with reference to FIG. 2. The support member 5 that constitutes first support means is fixed to the upper portion of the base 2 with a bolt 13. The center position of the bolt 13 is referred to as a first fixed position a. The support member 5 holds an outer ring of a bearing 51 that constitutes the first support means. A portion of a ball screw shaft 70 that constitutes the ball screw 7, the portion being near a first end of the ball screw shaft 70, is inserted into an inner ring of the bearing 51, and pressed against an end of the inner ring by a fastening member 11. Thus, this portion of the ball screw shaft 70 is supported rotatably and immovably in the X-axis direction. The center position of the bearing 51 in the X-axis direction is referred to as a first reference position c. Further, the motor 8 is fixed to an end of the support member 5, and an output shaft 81 of the motor 8 is coupled to the first end of the ball screw shaft 70.

The support member 6 that constitutes second support means is fixed to the upper portion of the base 2 with a bolt 14. The center position of the bolt 14 is referred to as a second fixed position b. The support member 6 holds an outer ring of a bearing 61 that constitutes the second support means, and an inner ring of the bearing 61 is fixed to a portion of the ball screw shaft 70, the portion being near a second end of the ball screw shaft 70, by a fastening member 12. The outer ring of the bearing 61 and the inner ring of the bearing 61 are rotatable relative to each other, and movable in the X-axis direction. Due to the foregoing structure, the ball screw shaft 70 is held so as to be allowed to linearly expand with respect to the first reference position c of the support member 5, in the X-axis direction.

A holding member 9 is fixed to an end d of the support member 6. The holding member 9 holds distance detection means 10 at such a position that a detection reference face 101 of the distance detection means 10 coincides with the end d of the support member 6 in the X-axis direction. Thus, the detection reference face 101 is arranged at a position located at a predetermined distance DL from an end face 701 at the second end of the ball screw shaft 70.

A ball screw nut 71 that constitutes the ball screw 7 is engaged with the ball screw shaft 70 so as to move relative to the ball screw shaft 70 as the ball screw nut 72 rotates relative to the ball screw shaft 70. The ball screw nut 71 is fixed to the movable body 4. Further, each of the base 2, the support member 5, and the support member 6 is provided with temperature detection means TS. Each temperature detection means TS detects the temperature of a corresponding one of the base 2, the support member 5 and the support member 6.

A positioning compensation method for compensating an error in the feed rate due to thermal displacement of the ball screw 7 in the positioning device 1 will be described. As shown in FIG. 2, the distance between the first fixed position a of the base 2 and the second fixed position b of the base 2 at a reference temperature is denoted by KL, the distance between the first fixed position a of the support member 5 and the first reference position c of the support member 5 at the reference temperature is denoted by SL1, and the distance between the second fixed position b of the support member 6 and the end d of the support member 6 at the reference temperature is denoted by SL2. In addition, the distance from the first reference position c of the ball screw shaft 70 to the end face 701 of the second end of the ball screw shaft 70 at the reference temperature is denoted by BL, and the distance from the end face 701 of the ball screw shaft 70 to the detection reference face 101 (the end d) at the reference temperature is denoted by DL. Accordingly, there is established a relationship, KL+SL2=SL1+BL+DL. Further, the lead of the ball screw 7 at this time is denoted by L.

Figure 3:
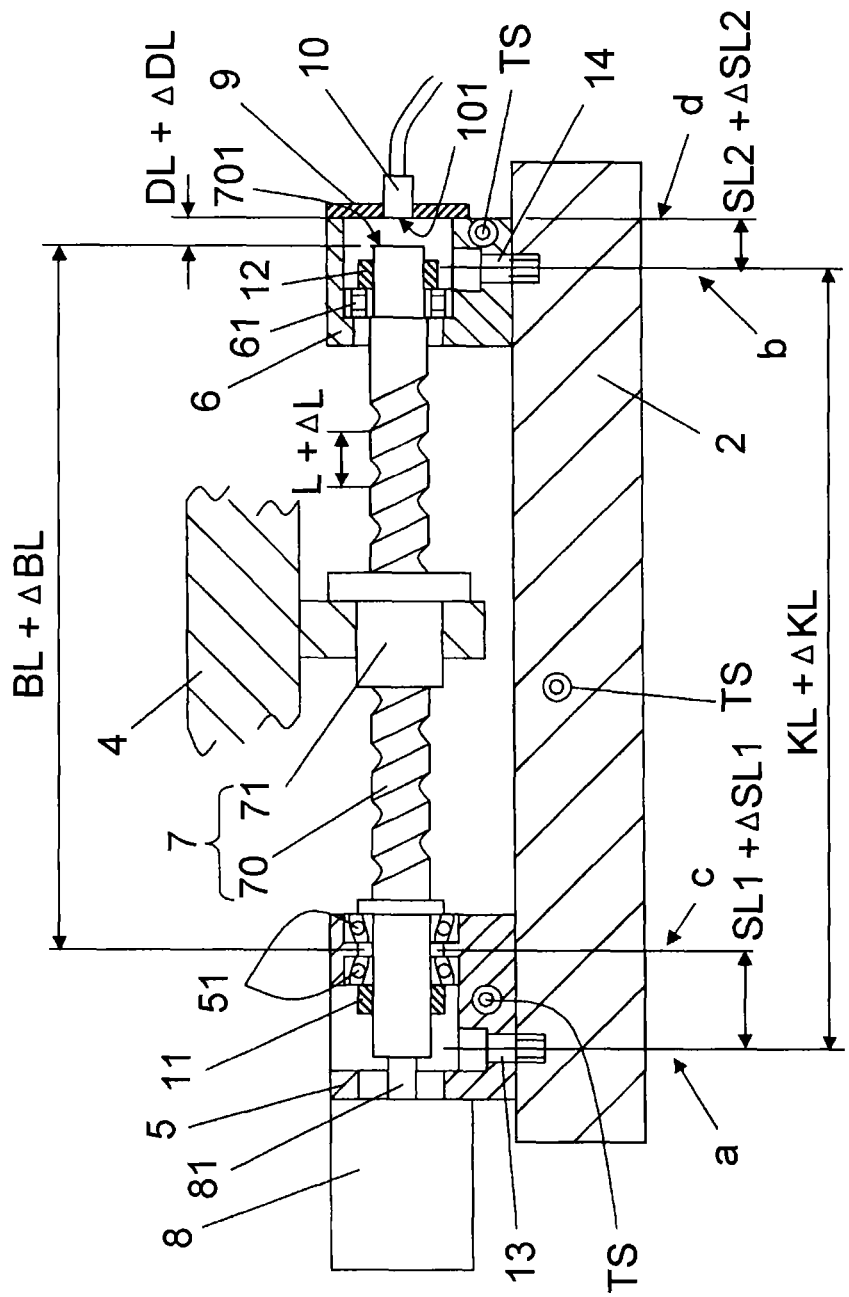
FIG. 3 is a sectional view of the screw portion of the positioning device at the time of occurrence of thermal displacement.

Next, the relationship at the time when temperatures of respective portions change to a predetermined temperature will be described with reference to FIG. 3. The distance between the first fixed position a of the base 2 and the second fixed position b of the base 2 at the predetermined temperature is denoted by KL+$\Delta$KL, the distance between the first fixed position a of the support member 5 and the first reference position c of the support member 5 at the predetermined temperature is denoted by SL1+$\Delta$SL1, and the distance between the second fixed position b of the support member 6 and the end d of the support member 6 at the predetermined temperature is denoted by SL2+$\Delta$SL2. In addition, the distance from the first reference position c of the ball screw shaft 70 to the end face 701 of the ball screw shaft 70 at the predetermined temperature is denoted by BL+$\Delta$BL, and the distance from the end face 701 of the ball screw shaft 70 to the detection reference face 101 (the end d) at the predetermined temperature is denoted by DL+$\Delta$DL. Accordingly, there is established a relationship, KL+$\Delta$KL+SL2+$\Delta$SL2=SL1+$\Delta$SL1+BL+$\Delta$BL+DL+$\Delta$DL. Further, the lead of the ball screw at this time is denoted by L+$\Delta$L.

By subtracting the relational expression of the distance among the respective portions at the reference temperature, KL+SL2=SL1+BL+DL, from the relational expression of the distance among the respective portions at the predetermined temperature, KL+$\Delta$KL+SL2+$\Delta$SL2=SL1+$\Delta$SL1+BL+$\Delta$BL+DL+$\Delta$DL, there is established a relationship, $\Delta$KL+$\Delta$SL2=$\Delta$SL1+$\Delta$BL+$\Delta$DL.

It should be noted herein that the base 2 and the support members 5, 6 are made of the same ferrous material. Therefore, if the linear expansion coefficient is denoted by $\rho$ as the same value and the difference between the reference temperature of the base 2 and the predetermined temperature is denoted by $\Delta$t1, the amount of linear expansion of the base 2 at the distance KL due to the temperature difference $\Delta$t1 is equal to $\Delta$KL. Accordingly, there is established a relationship, $\Delta$KL=$\rho\cdot\Delta$t1$\cdot$KL. Similarly, if the difference between the reference temperature of the support member 5 and the predetermined temperature is denoted by $\Delta$t2, there is established a relationship, $\Delta$SL1=$\rho\cdot\Delta$t2$\cdot$SL1. If the difference between the reference temperature of the support member 6 and the predetermined temperature is denoted by $\Delta$t3, there is established a relationship, $\Delta$SL2=$\rho\cdot\Delta$t3$\cdot$SL2.

Accordingly, there is established a relationship, $\rho\cdot\Delta$t1$\cdot$KL+$\rho\cdot\Delta$t3$\cdot$SL2=$\rho\cdot\Delta$t2$\cdot$SL1+$\Delta$BL+$\Delta$DL, and $\Delta$BL is computed according to an expression, $\Delta$BL=$\rho\cdot\Delta$t1$\cdot$KL+$\rho\cdot\Delta$t3$\cdot$SL2−$\rho\cdot\Delta$t2$\cdot$SL1−$\Delta$DL. It should be noted herein that $\Delta$t1, $\Delta$t2, $\Delta$t3 are measured by temperature detection means TS, ΔDL is measured by distance detection means 10, and ρ, KL, SL2, and SL1 are known. Therefore, the amount of change ΔBL in the distance from the first reference position c of the ball screw shaft 70 to the end face 701 of the ball screw shaft 70 is measured on the basis of the values measured by the temperature detection means TS and the distance detection means 10. The amount of change ΔL in the lead is proportional to the amount of change ΔBL in the distance from the first reference position c of the ball screw shaft 70 to the end face 701 of the ball screw shaft 70, and is therefore expressed as ΔL=ΔBL·L/BL.

Next, the compensation of fluctuations in feedrate due to changes in temperature will be described. A travel distance T0 of the movable body 4 at the reference temperature is expressed by an expression, T0=L·θ/360, if the rotational angle of the ball screw shaft 70 is denoted by θ and the lead of the ball screw shaft 70 is denoted by L. In addition, a travel distance T1 of the movable body 4 at the predetermined temperature is expressed as T1=(L+ΔL)·θ/360. In order to make the travel distance of the movable body 4 at the reference temperature and the travel distance of the movable body 4 at the predetermined temperature equal to each other, an adjustment should be made by increasing/reducing the rotational angle θ by Δθ on the basis of the amount of change ΔL in the lead due to changes in temperature. That is, at the predetermined temperature, a compensation should be made with a compensation angle Δθ such that there is established a relationship, T0=L·θ/360=(L+ΔL)·(θ+Δθ)/360. If the aforementioned expression is transformed, the compensation angle Δθ is computed according to the expression, Δθ=−ΔL·θ/(L+ΔL), from L·θ=(L+ΔL)·(θ+Δθ).

A concrete method of compensating the feedrate will be described hereinafter. First of all, KL, SL2, SL1, BL, DL, L at the time when the base 2, the support member 5, the support member 6, and the ball screw 7 are at the reference temperature are measured and stored in the storage unit 301. Furthermore, the values of the linear expansion coefficient ρ of the base 2, the support member 5, and the support member 6, and the value of the reference temperature t0 are also stored in the storage unit 301. When a command on the travel distance T0 of the movable body 4 is issued, a temperature t1 of the base 2, a temperature t2 of the support member 5, and a temperature t3 of the support member 6 are measured by the temperature detection means TS, and DL+ΔDL is measured by the distance detection means 10. These measured values are stored in the storage unit 301.

In the computation unit 302, the temperature differences from the reference temperature are computed according to the following expressions, Δt1=t1−t0, Δt2=t2−t0, and Δt3=t3−t0, ΔBL is computed according to the following expression, ΔBL=ρ·Δt1·KL+ρ·Δt3·SL2−ρ·Δt2·SL1−ΔDL, and ΔL is computed as ΔBL·L/BL. These computed values are stored in the storage unit 301. An amount of rotation θ0 of the ball screw 7 at the reference temperature, which is required to move the movable body 4 by T0, is computed according to an expression, θ0=T0·360/L, and a compensation amount of rotation Δθ of the ball screw 7, which is required to move the movable body 4 by T0 at the predetermined temperature, is computed according to an expression, Δθ=−ΔL·θ/(L+ΔL). A command to rotate the motor 8 by an angle of θ+Δθ is issued by the motor control unit 303.

A contactless capacitance sensor or a contact electric micrometer may be employed as the distance detection means 10. Besides, other known distance measuring instruments may be employed. A thermoelectric couple, a thermistor, or any other known temperature detector may be employed as the temperature detection means TS.

As described above, the positioning device 1 according to the above-described embodiment of the invention makes it possible to accurately measure the thermal displacement of the ball screw, and accurately compensate the error in feed rate due to the thermal displacement. Therefore, the positioning device that enables accurate positioning is realized.

What is claimed is:

1. A positioning device, comprising:
   a base;
   a movable body that is supported so as to be allowed to reciprocate in a predetermined axial direction with respect to the base;
   a ball screw that is engaged with the movable body, and that reciprocates the movable body;
   a drive motor that is engaged with a first end of the ball screw, and that transmits rotative power to rotate the ball screw;
   first support means that is fixed to a first fixed position of the base, and that supports a portion of the ball screw, the portion being near the first end of the ball screw, at a first reference position that is located at a predetermined distance from the first fixed position in the axial direction such that the portion of the ball screw is rotatable and immovable in the axial direction;
   second support means that is fixed to a second fixed position of the base, and that supports a second end of the ball screw such that the second end is rotatable and movable in the axial direction;
   distance detection means that is located at a given distance from an end face of the second end in an axial direction of the ball screw, that is fixed to the second support means at a second reference position that is located at a predetermined distance from the second fixed position in the axial direction, and that is able to detect a distance to the end face;
   temperature detection means for detecting a temperature of the base, a temperature of the first support means, and a temperature of the second support means; and
   control means for controlling the drive motor, wherein
   the control means stores
   a base reference length that is a length of a portion of the base from the first fixed position to the second fixed position at a reference temperature,
   a first support means reference length that is a length of a portion of the first support means from the first fixed position to the first reference position at the reference temperature,
   a second support means reference length that is a length of a portion of the second support means from the second fixed position to the second reference position at the reference temperature, and
   a ball screw reference length that is a length of a portion of the ball screw from the first reference position to the end face of the ball screw at the reference temperature, and
   the control means obtains a ball screw actual length that is an actual length of the portion of the ball screw from the first reference position to the end face of the ball screw on the basis of
   an amount of linear expansion of the base reference length, which is obtained through computation based on the base reference length and the detected temperature of the base that is detected by the temperature detection means,
   an amount of linear expansion of the first support means reference length, which is obtained through computation based on the first support means reference length and the detected temperature of the first support means that is detected by the temperature detection means, an amount of linear expansion of the second support means reference length, which is obtained through computation based on the second support means reference length and the detected temperature of the second support means that is detected by the temperature detection means, and the detected distance that is detected by the distance detection means, and the control means compensates a control amount of the drive motor based on the ball screw actual length and the ball screw reference length.

* * * * *